United States Patent [19]

Meyer

[11] Patent Number: 4,539,935
[45] Date of Patent: Sep. 10, 1985

[54] COMBINATION PET BED AND ENCLOSURE

[76] Inventor: Fred Meyer, P.O. Box 66, Summerville, S.C. 29483

[21] Appl. No.: 642,648

[22] Filed: Aug. 20, 1984

[51] Int. Cl.³ .............................................. A01K 1/035
[52] U.S. Cl. .......................................... 119/1; 119/19
[58] Field of Search ...................... 119/1, 19; 220/4 B

[56] References Cited

U.S. PATENT DOCUMENTS 2,186,365  1/1940  Castles ................................ 220/4 B
3,125,663  3/1964  Hoffman ............................. 119/1 X
3,710,761  1/1973  Gregory .................................. 119/19

Primary Examiner—Hugh R. Chamblee
Attorney, Agent, or Firm—B. C. Killough

[57] ABSTRACT

A pet bed and enclosure is disclosed which allows for the enclosure to be conveniently and attractively stored with the pet bed when the bed is not enclosed, and to provide an enclosure which will cover the pet bed when desired which is resistent to sliding from the pet bed.

3 Claims, 5 Drawing Figures

COMBINATION PET BED AND ENCLOSURE

This invention relates to a device which may be used as a pet bed, having an easily stored enclosure which may be used to enclosed the pet bed such as to bury or entomb the pet upon death of the pet.

An object of the present invention is to provide a pet bed which may be enclosed for any desired purpose, including use as a casket for burial of the pet.

Another object is to provide a pet bed having an enclosure which may be easily and attractively stored away when being used in an unenclosed fashion.

Still another object of the invention is to provide a pet bed which may be enclosed in a simple fashion while providing a means for holding the top enclosure in place, and facilitating the carrying of the pet bed while it is enclosed.

Figure 1:
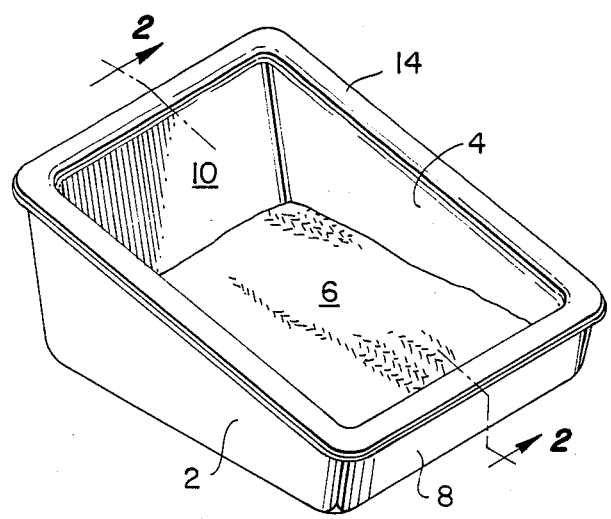
FIG. 1 is a perspective view of the combination pet bed and enclosure.
Figure 2:
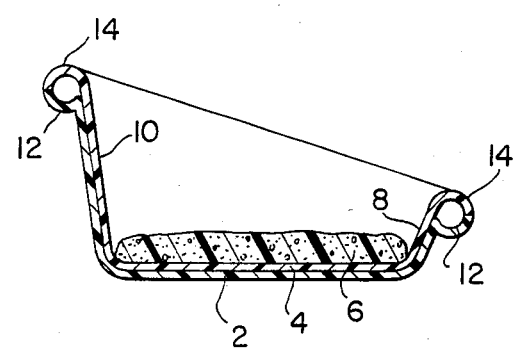
FIG. 2 is a side, sectioned view of the combination pet bed and enclosure, taken essentially along line 2—2 of FIG. 1.
Figure 3:
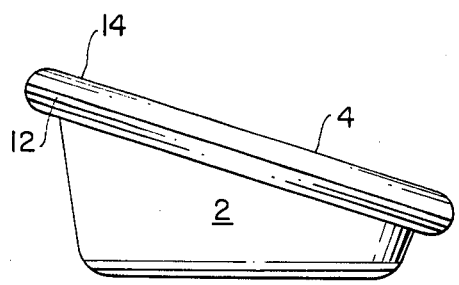
FIG. 3 is a side elevation of the combination pet bed and enclosure.

The combination pet bed and enclosure provides a pet bed for a dog, cat or other house pet. However, when the need arises to enclose the pet bed, a top enclosure is available. The top enclosure is conveniently and easily stored away with the pet bed while the device is in use as a pet bed.

The combination pet bed and enclosure is in essentially three parts, having a top enclosure 2, a pet bed portion 4, and a cushion or mattress 6. FIGS. 1, 2, 3, and 5 depict the device in use as a pet bed, with the top enclosure 2 stored under the pet bed portion 4. Both the top enclosure 2 and the pet bed portion 4 are of the same general size and shape, being generally rectangular when viewed from the top as in FIG. 5 and allowing the pet bed portion to be inserted into the top enclosure 2. One side of the device 8 may be lower than an opposite side 10, to allow ingress and egress of the animal. When the device is being used as a pet bed, the device is constructed so that the pet bed portion 4 may be inserted into the inverted top enclosure 2, so that the top enclosure 2 is stored. A semi-cylindrical border 12, 14 is molded around the circumference of the sides of both the top enclosure and pet bed portion. When the device is being used as a pet bed, and the pet bed portion is inserted into the top enclosure, the combination of the semi-cylindrical borders 12, 14 form a cylindrical border, giving the device the attractive appearance of being formed in one piece.

Figure 4:
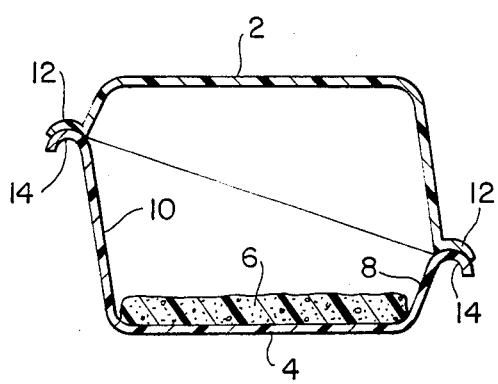
FIG. 4 is a side, sectioned view of the combination pet bed and enclosure, taken essentially along line 2—2 of FIG. 1, with the combination pet bed and enclosure in the enclosed form.
Figure 5:
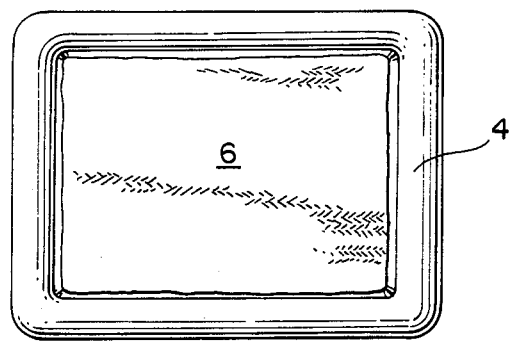
FIG. 5 is a plan view of the combination pet bed and enclosure shown in position for use as a pet bed.

When it is desired for the pet bed to be enclosed, such as when the pet has expired and is to be buried, the pet bed portion 4 may be removed from the top enclosure 2, and the top enclosure 2 inverted and placed over the pet bed portion 4 as shown in FIG. 4. The semi-cylindrical border 12 of the top enclosure 2 fits over the semi-cylindrical border 14 of the pet bed portion 4, holding the top enclosure 2 in place. By the border 14 of the top enclosure fitting over the border 12 of the pet bed portion 4, the top enclosure 2 is not subject to slipping or sliding off of the pet bed portion 4.

The semi-cylindrical shape of the border 14 provides a handle or place to grip the enclosed pet bed to facilitate movement and carrying of the device.

The combination pet bed and enclosure may be made of any suitable material, but the top enclosure and the pet bed portion particularly lend themselves to being made of molded plastic. The cushion or mattress may be made of any suitable material, including foam rubber covered with fabric.

What is claimed is:

1. A combination pet bed and enclosure, comprising:
   a. a pet bed portion having four walls with each of said walls joining two remaining walls at right angles, and being connected by a bottom side adjoining each of said walls, and further having a semi-cylindrical border around the perimeter of said walls;
   b. a top enclosure of essentially the same size and shape as said pet bed portion so as to allow said pet bed portion to be inserted into said top enclosure, having a semi-cylindrical border inverted from that of said pet bed portion so that said semi-cylindrical borders of said pet bed portion and said top enclosure meet to form a cylinder when said top enclosure is inserted into said pet bed portion, and upon inverting and rotating said top enclosure 180 degrees, allowing said top enclosure to fit over and enclose said pet bed portion so as to be held in place by said semi-cylindrical borders fitting within each other.

2. A combination pet bed and enclosure as described in claim 1, wherein one of said walls of said pet bed portion and said top enclosure is shorter than said wall to which it is parallel so as to allow ingress and egress of a pet.

3. A combination pet bed and enclosure as described in claim 1 wherein said pet bed portion has a mattress located therein.

* * * * *